(12) United States Patent
Mochizuki et al.

(10) Patent No.: US 7,533,752 B2
(45) Date of Patent: May 19, 2009

(54) STRADDLE-TYPE VEHICLE

(75) Inventors: Kan Mochizuki, Shizuoka (JP); Takaaki Imamura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 176 days.

(21) Appl. No.: 11/616,178

(22) Filed: Dec. 26, 2006

(65) Prior Publication Data

US 2007/0145701 A1   Jun. 28, 2007

(30) Foreign Application Priority Data

Dec. 28, 2005   (JP) .............................. 2005-377287

(51) Int. Cl.
   *B62K 11/00* (2006.01)
(52) U.S. Cl. .................. 180/219; 180/337; 180/366
(58) Field of Classification Search ................ 180/219, 180/337, 366, 218, 220, 230, 334
   See application file for complete search history.

(56) References Cited

U.S. PATENT DOCUMENTS

| | | | | |
|---|---|---|---|---|
| 5,927,151 A | * | 7/1999 | Alber et al. ................ 74/473.3 |
| 6,591,934 B2 | * | 7/2003 | Tsutsumikoshi ............ 180/291 |
| 6,823,829 B1 | * | 11/2004 | Kawamoto et al. ...... 123/196 R |
| 7,398,853 B2 | * | 7/2008 | Ohtsuki et al. .............. 180/312 |
| 2001/0047901 A1 | * | 12/2001 | Tsutsumikoshi ............ 180/219 |
| 2004/0244760 A1 | * | 12/2004 | Kawamoto et al. ...... 123/196 R |
| 2004/0245050 A1 | * | 12/2004 | Kawamoto et al. ........... 184/6.5 |
| 2005/0204737 A1 | * | 9/2005 | Yoshida ....................... 60/487 |
| 2006/0122017 A1 | * | 6/2006 | Masuda et al. .............. 474/144 |
| 2006/0169562 A1 | * | 8/2006 | Kosugi ......................... 192/83 |
| 2007/0068296 A1 | * | 3/2007 | Oda et al. ..................... 74/329 |
| 2007/0075521 A1 | * | 4/2007 | Ogasawara et al. ......... 280/291 |

FOREIGN PATENT DOCUMENTS

| | | |
|---|---|---|
| JP | 11-082734 | 3/1999 |
| JP | 2001-208196 | 8/2001 |

* cited by examiner

*Primary Examiner*—Paul N Dickson
*Assistant Examiner*—Tashiana Adams
(74) *Attorney, Agent, or Firm*—Hogan & Hartson LLP

(57) ABSTRACT

A motorcycle includes a power unit. A fly wheel magnet on a left end side of a crank shaft, a transmission having plural gears, a transmission clutch and a shift shaft for connecting and disconnecting the transmission clutch and changing gears of the transmission are housed in a crank case of the power unit. A part of the shift shaft projects from the crank case. A projection part of the shift shaft and an output shaft of an actuator are connected outside the crank case by means of a connection body. A rod of a connection body extends vertically behind the fly wheel magnet.

12 Claims, 14 Drawing Sheets

[Fig. 1]
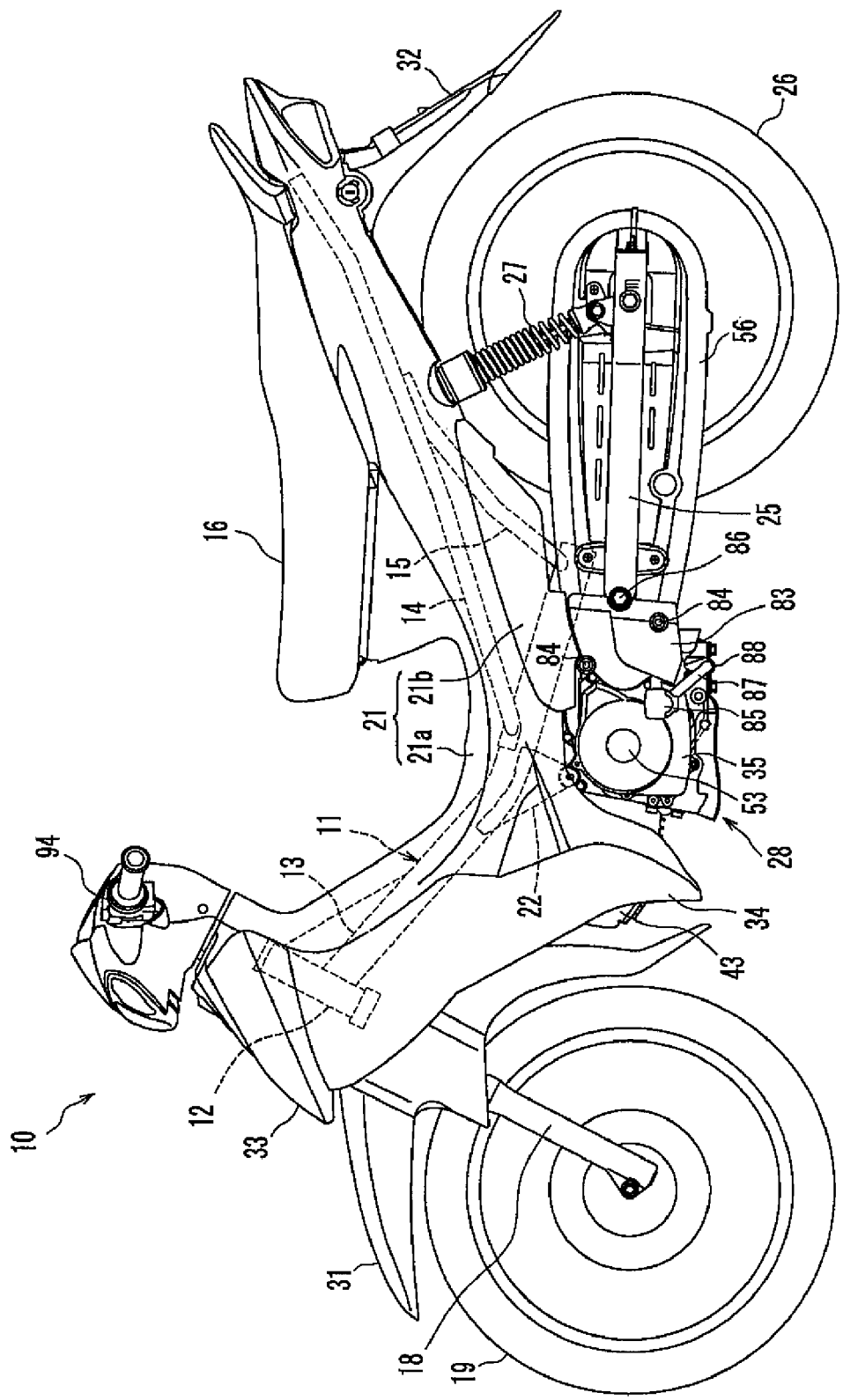

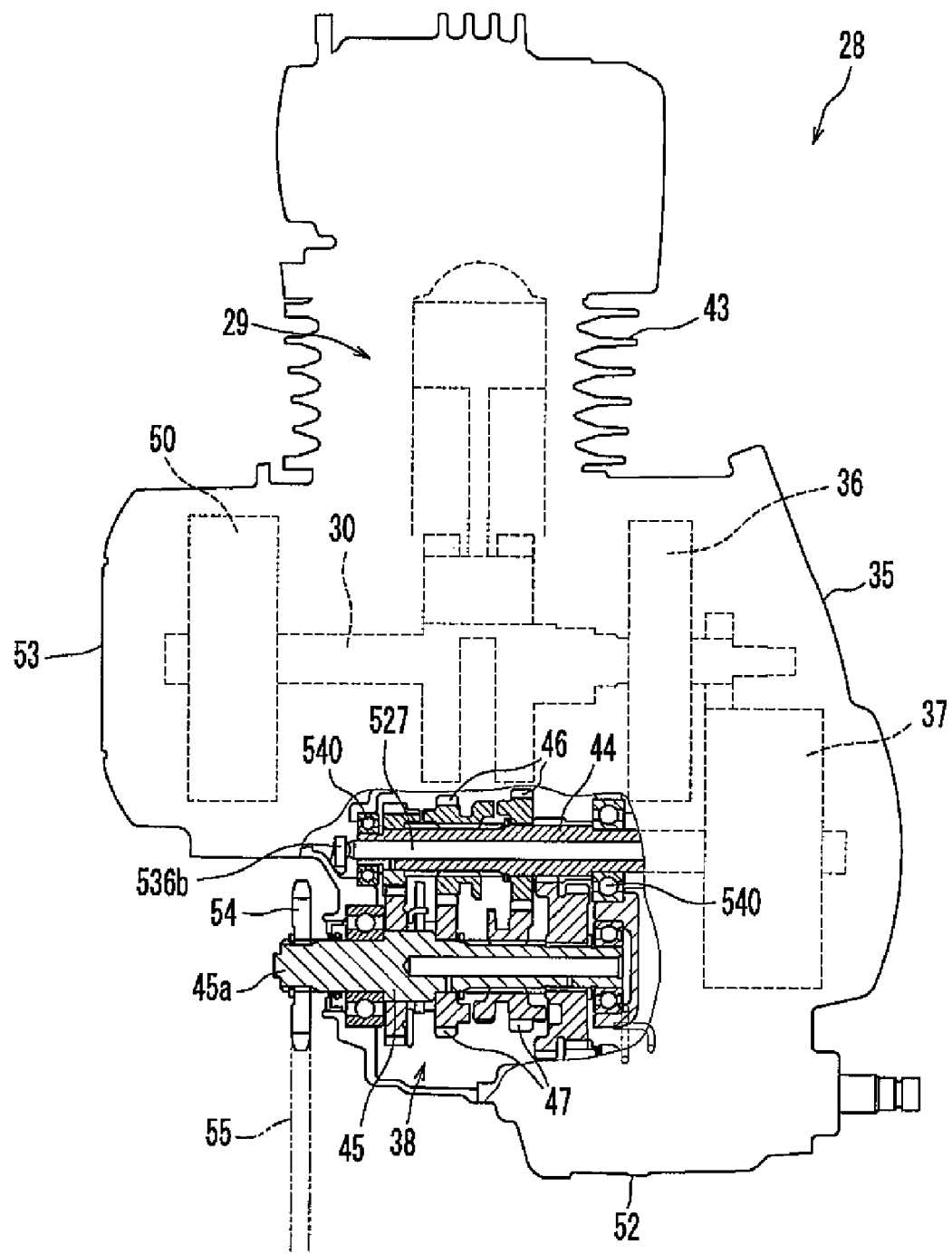
[Fig. 2]

[Fig. 3]
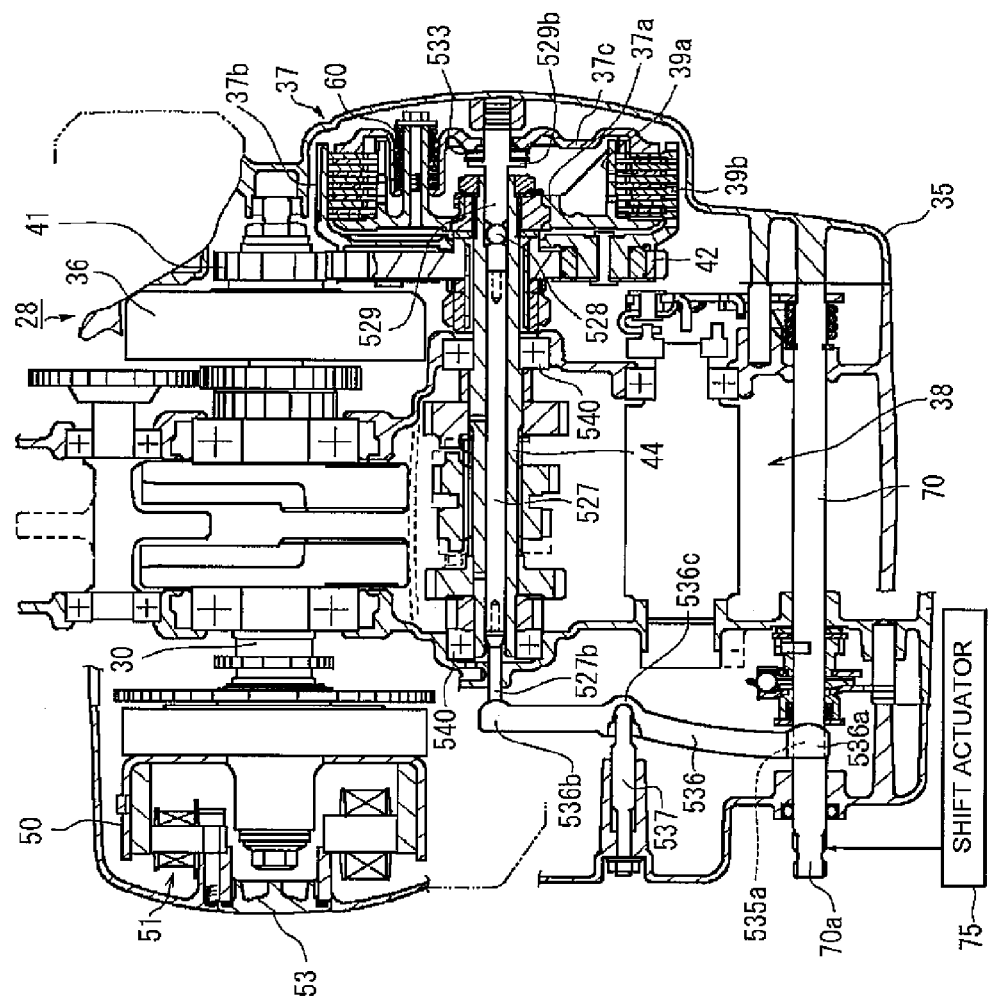

[Fig. 4]
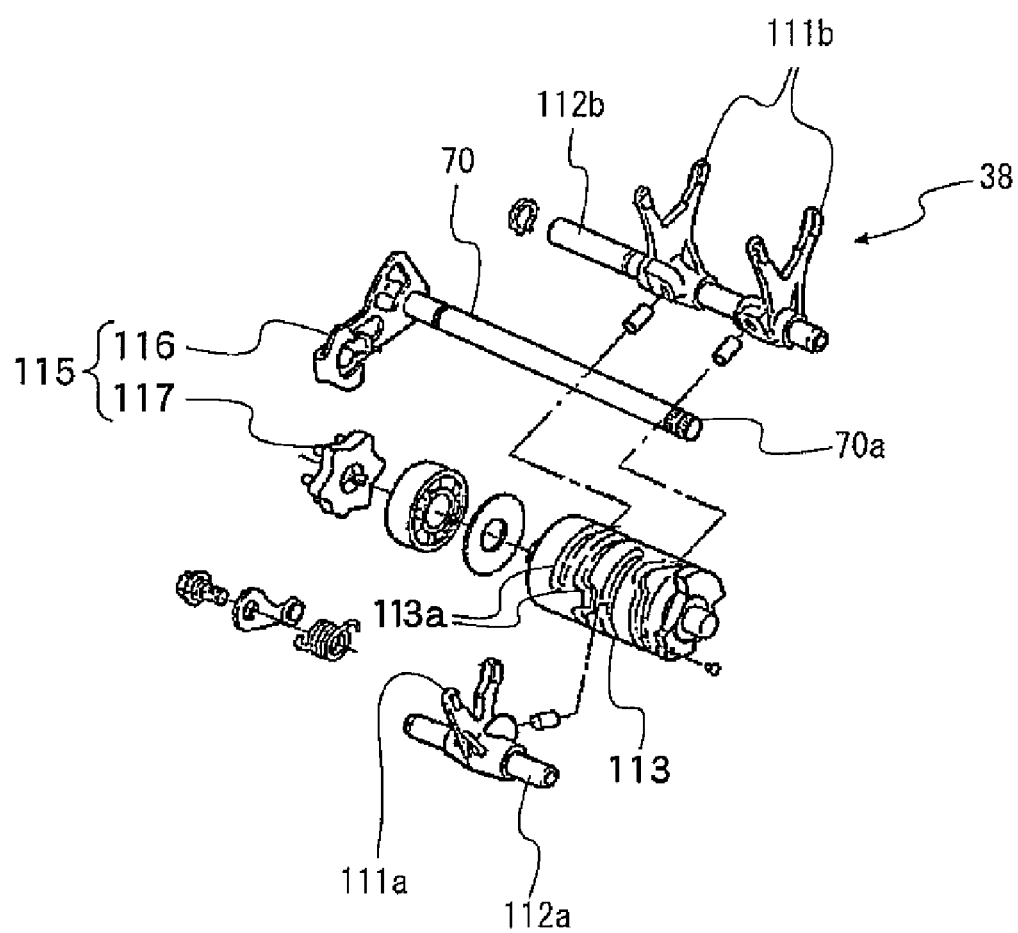

[Fig. 5]
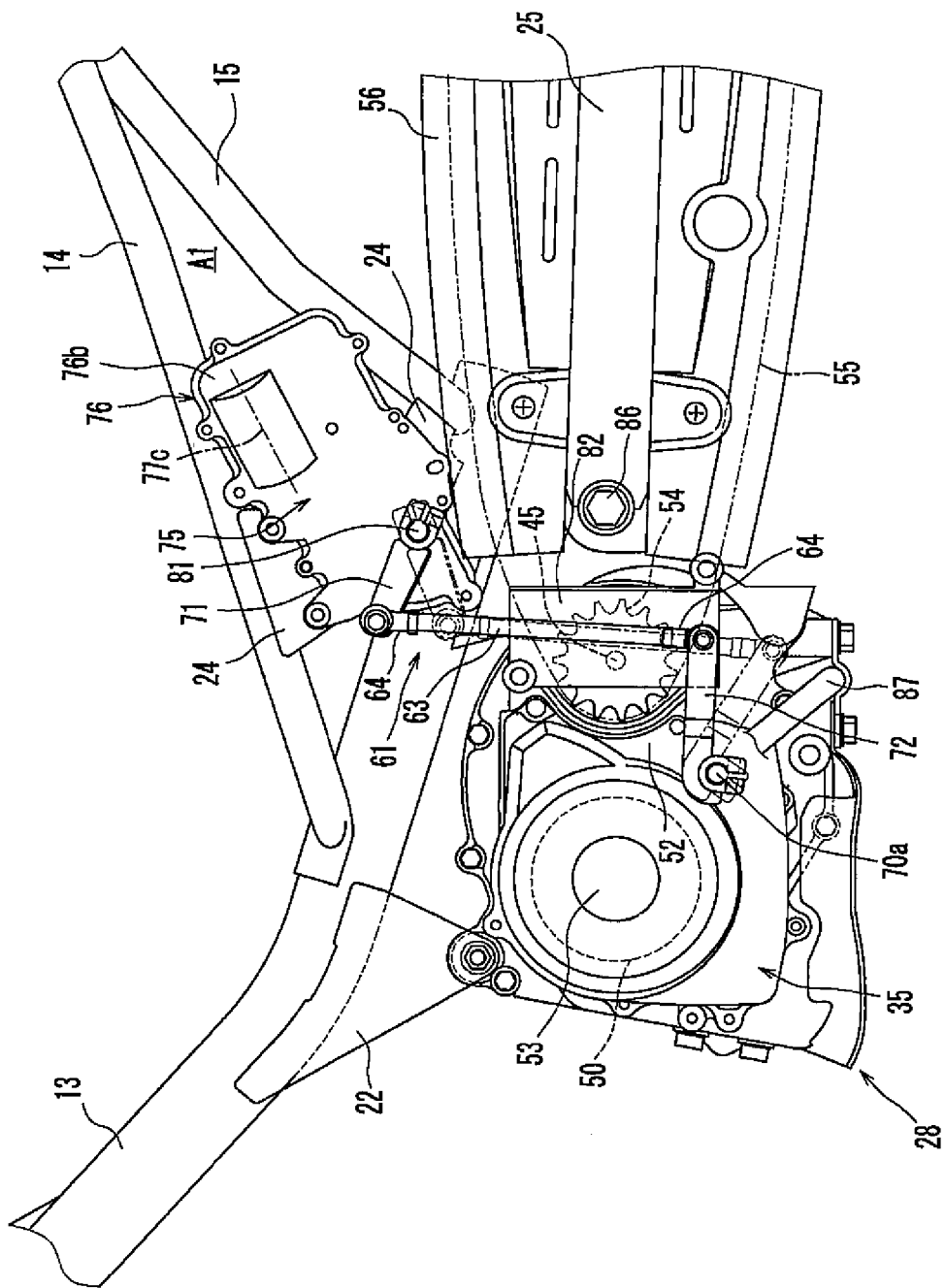

[Fig. 6]
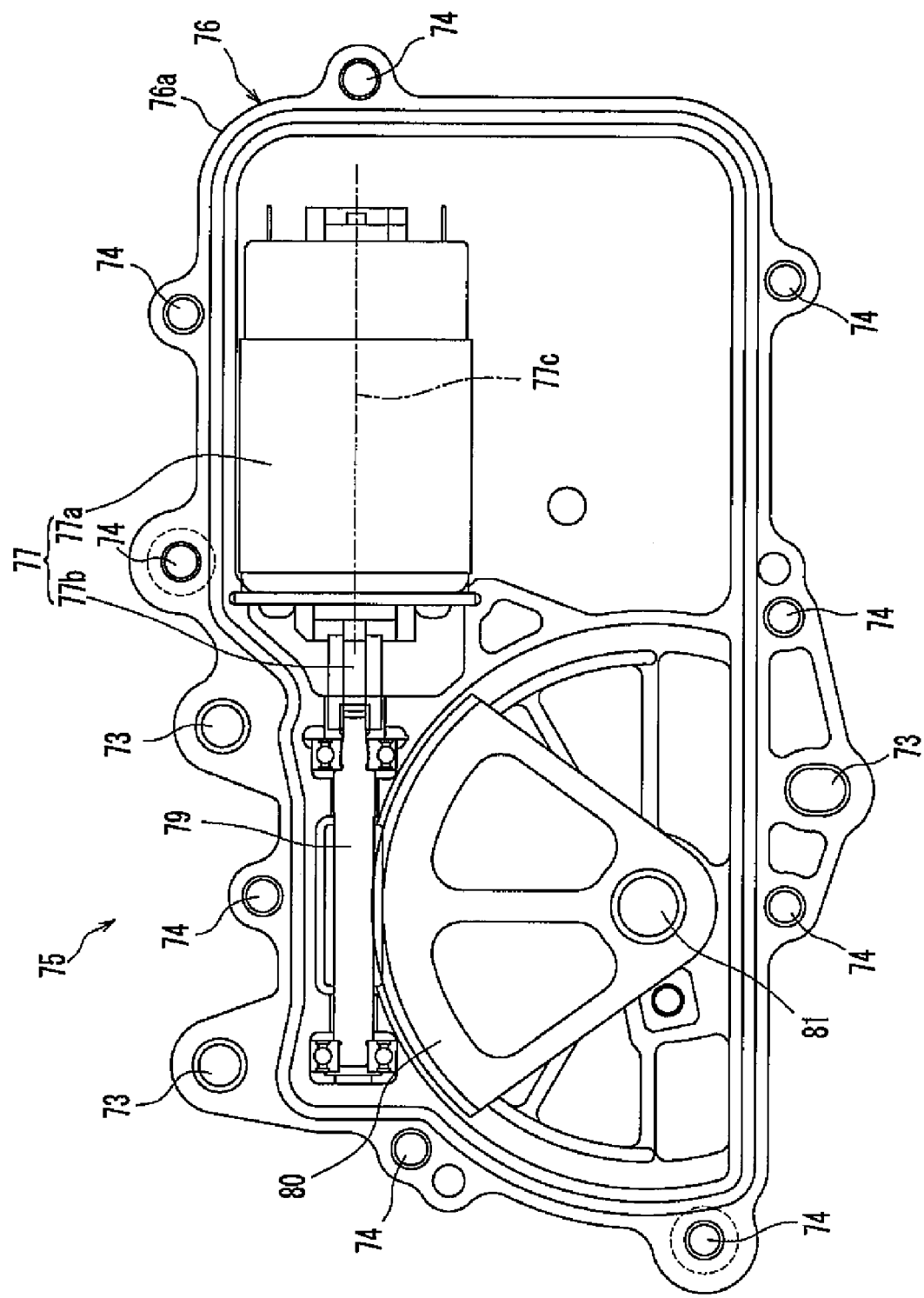

[Fig. 7]
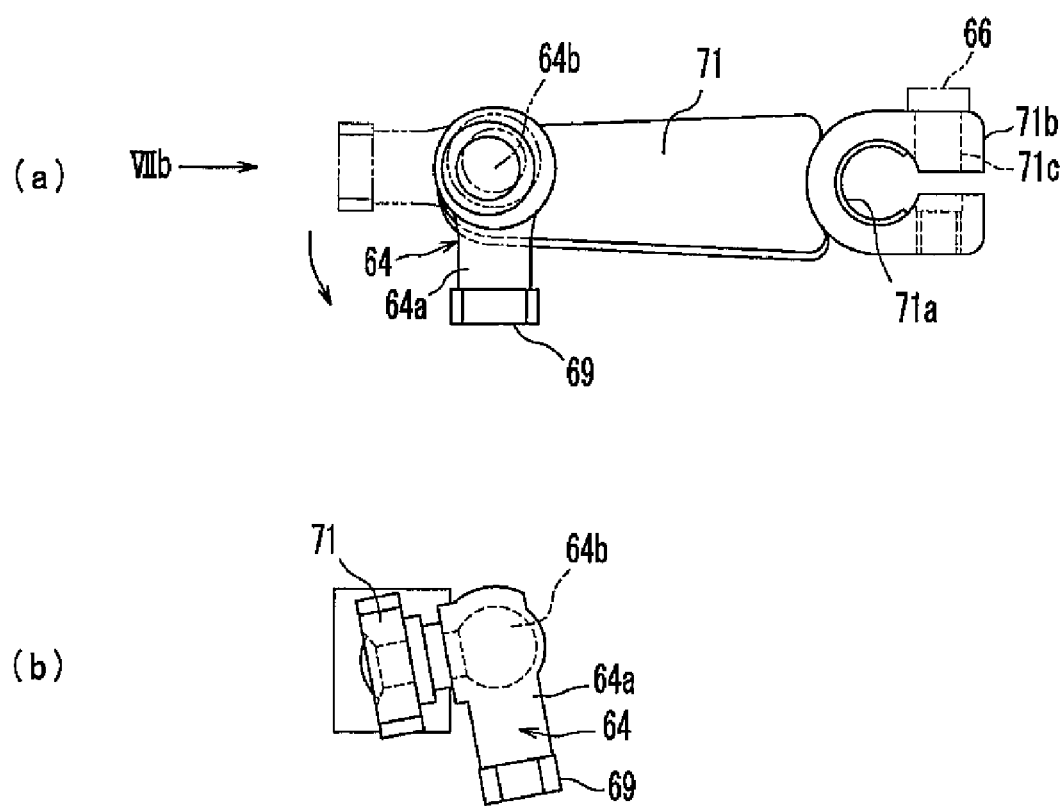

[Fig. 8]
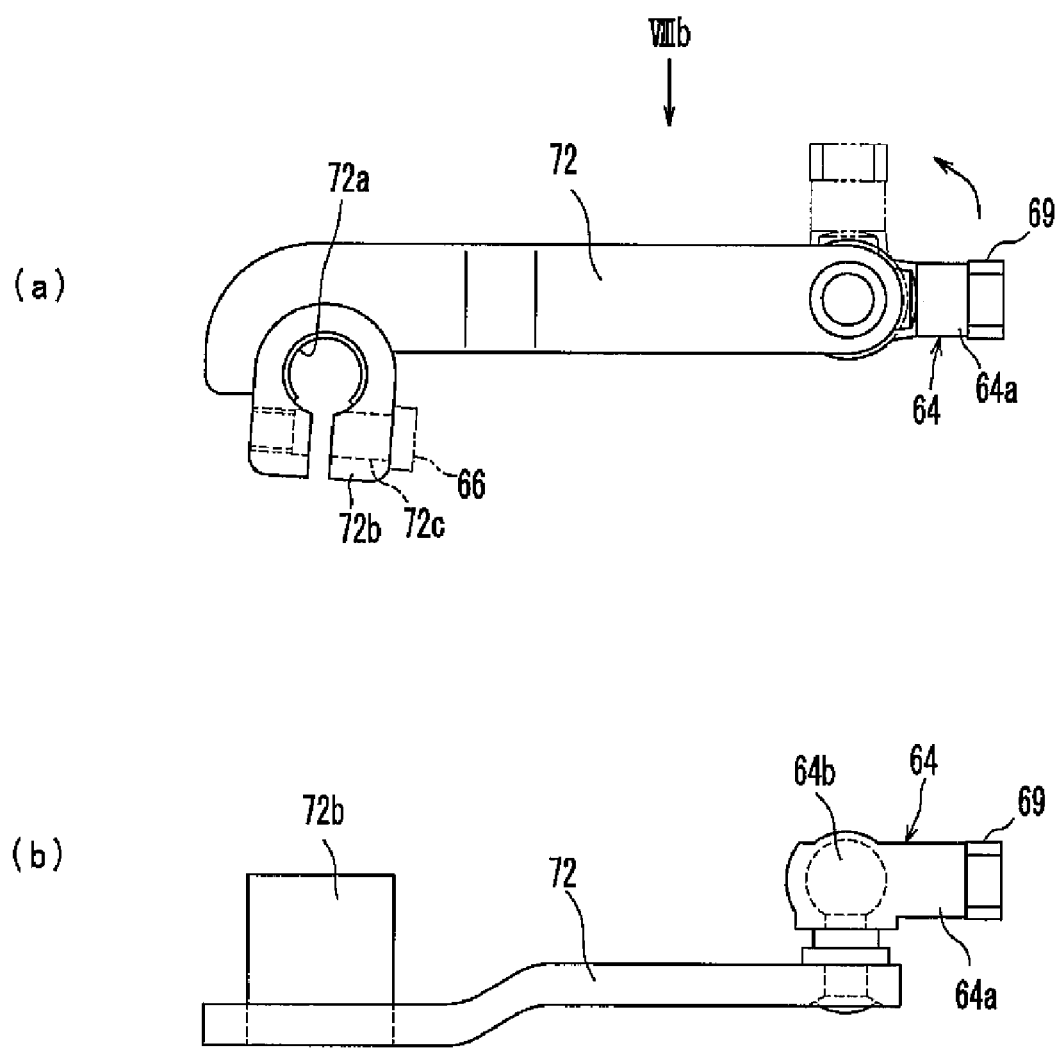

[Fig. 9]
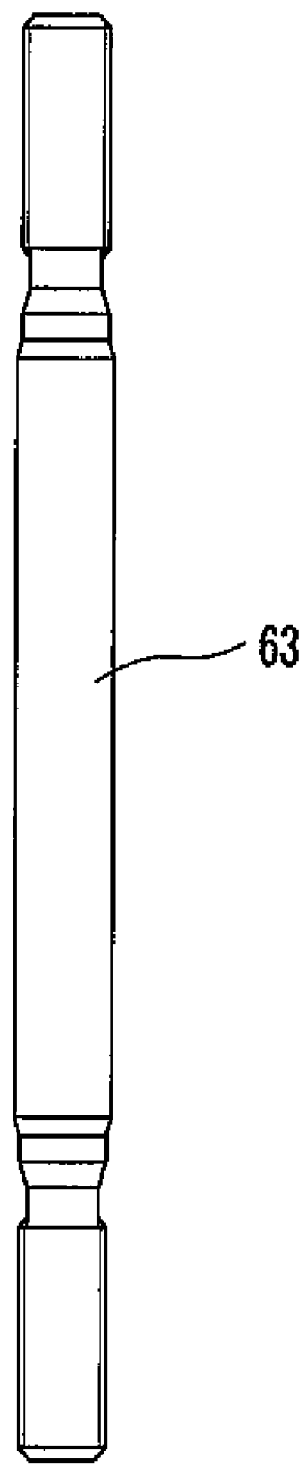

[Fig. 10]
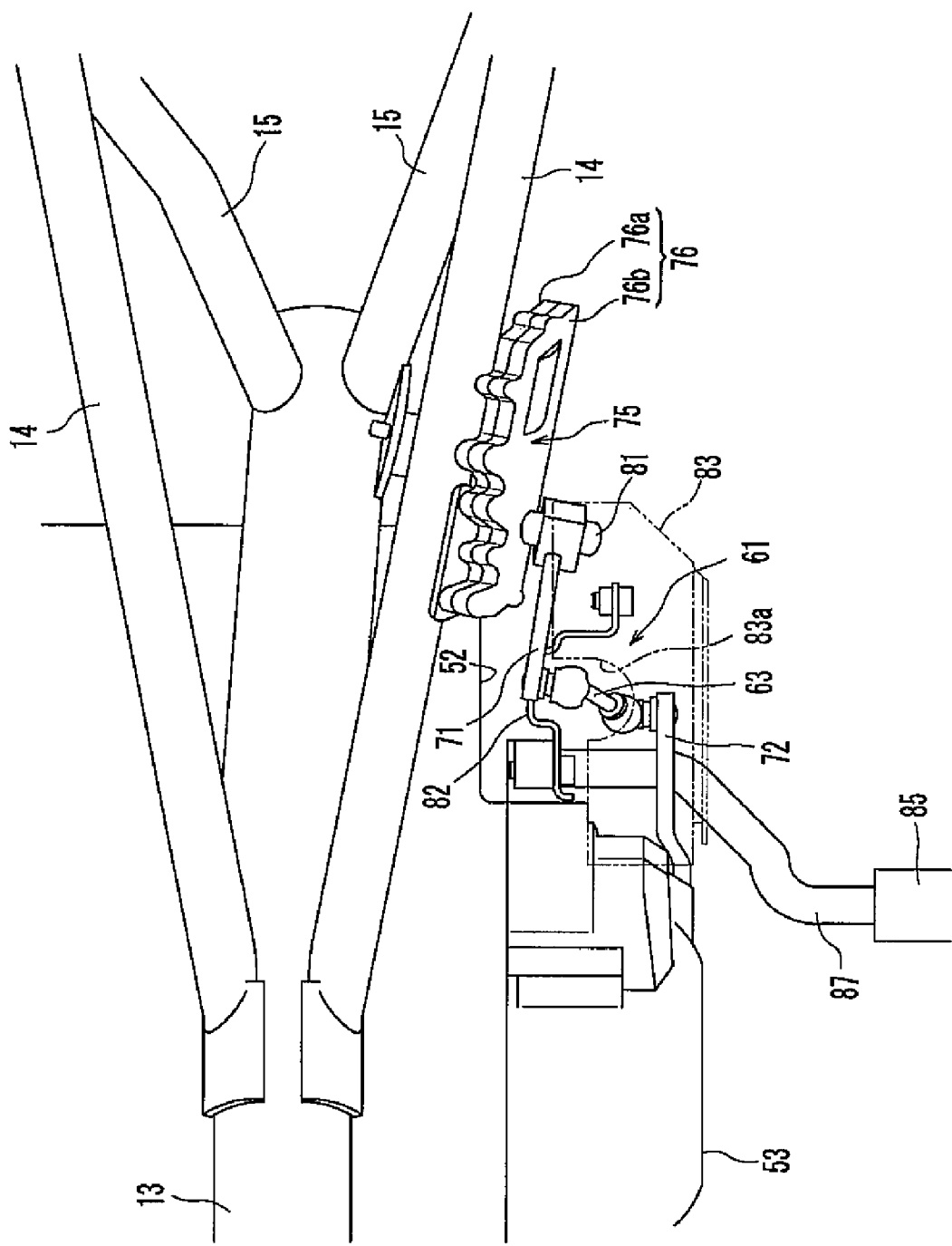

[Fig. 11]
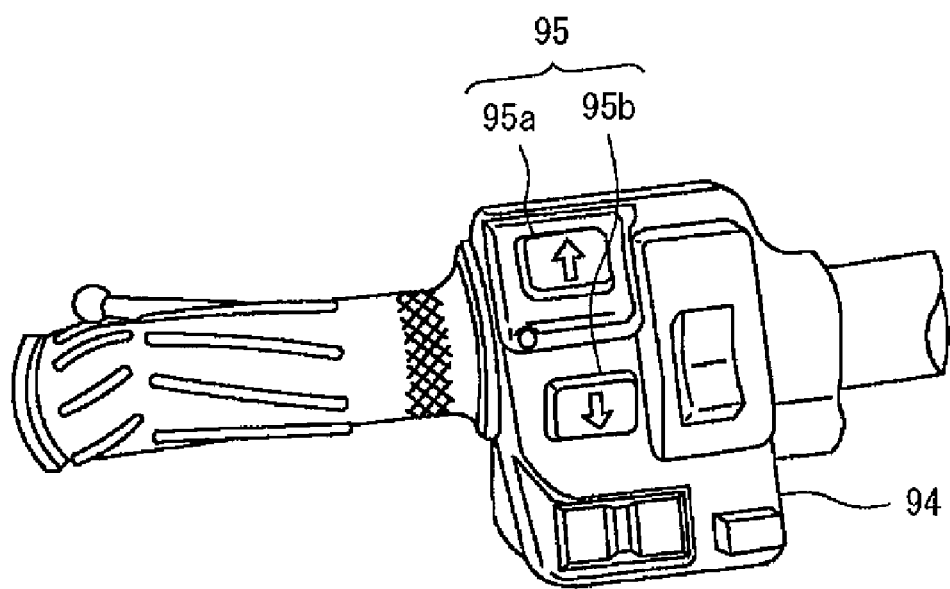

[Fig. 12]
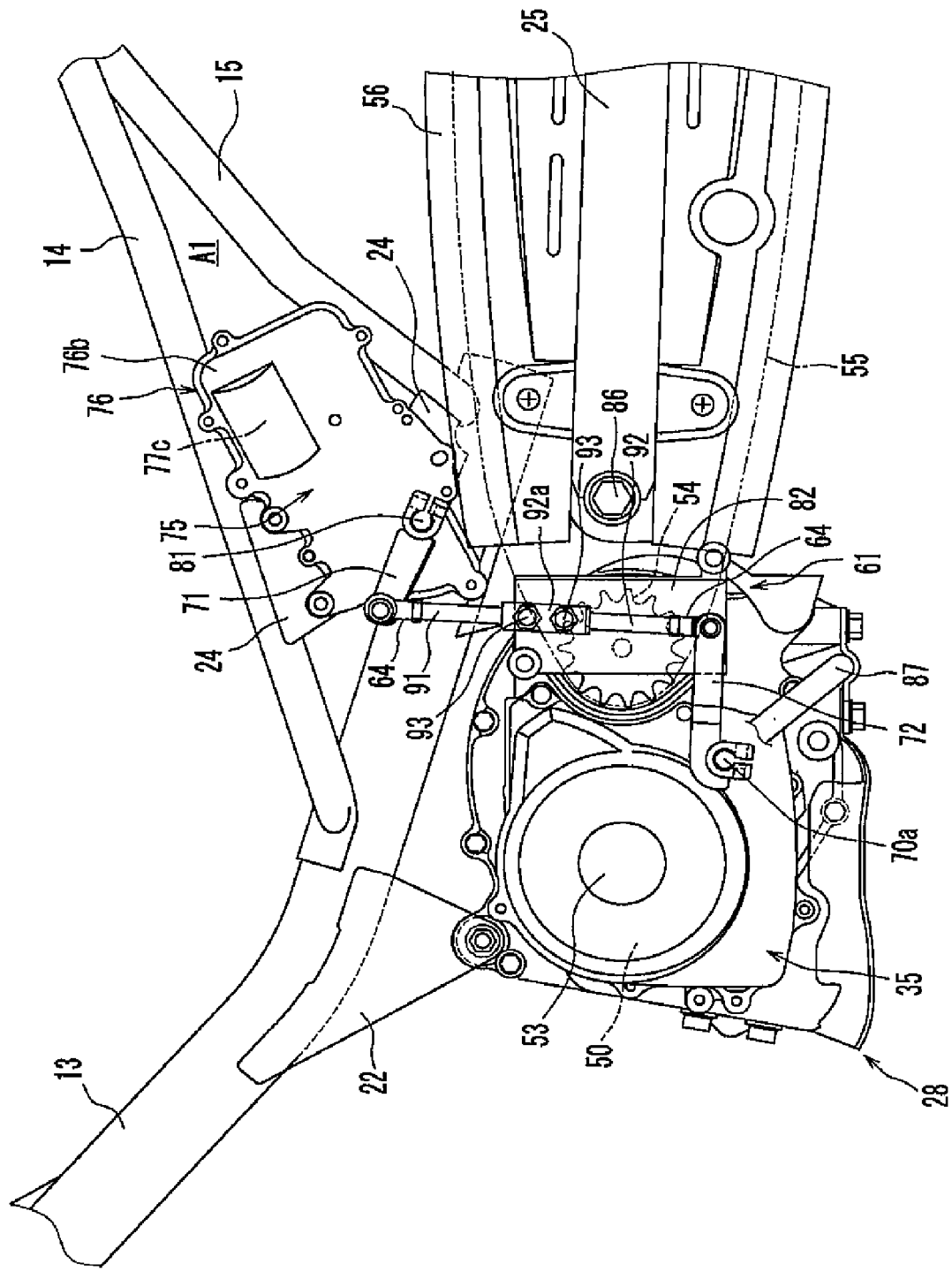

[Fig. 13]
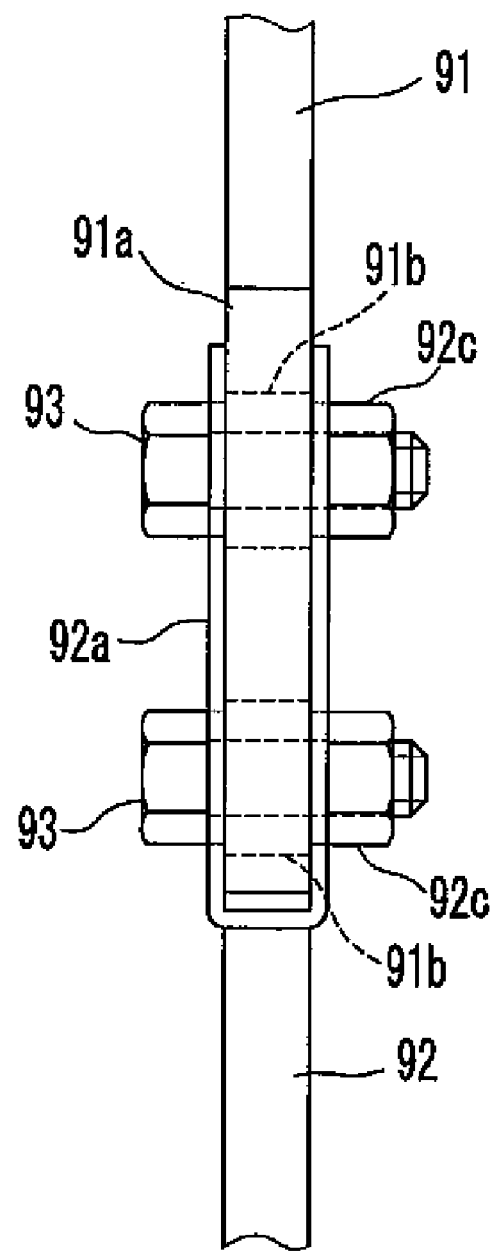

[Fig. 14]
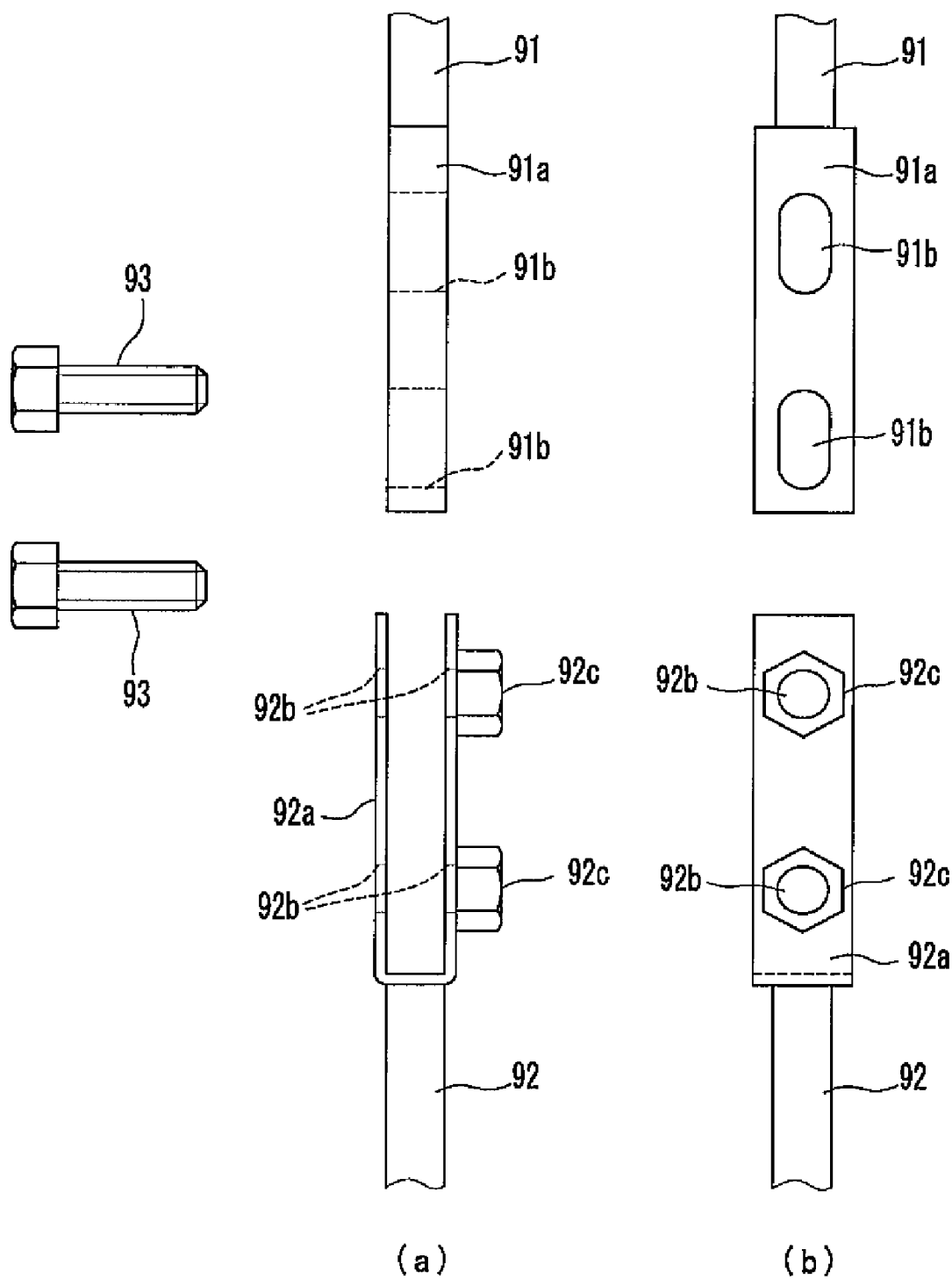
(a)     (b)

STRADDLE-TYPE VEHICLE

RELATED APPLICATIONS

This application claims the benefit of priority under 35 USC 119 of Japanese patent application no. 2005-377287, filed on Dec. 28, 2005, which application is hereby incorporated by reference in its entirety.

BACKGROUND OF THE INVENTION

1. Field of the Invention

The invention relates to a straddle-type vehicle comprising an automatic change gear device.

2. Description of Related Art

In conventional straddle-type vehicles including a transmission having plural gears and a clutch connected and disconnected in changing the gears, there is often an automatic change gear device for automatically performing the connecting and disconnecting operation of the clutch and the gear-changing operation of the transmission by means of a common actuator.

JP-A-11-82734 and JP-A-2001-208196, for example, disclose automatic change gear devices including motors as such a common actuator. As described in JP-A-11-82734, using a single motor in common for connecting and disconnecting a clutch and for changing gears of a transmission causes certain synchronization of the timing of connection and disconnection of the clutch and the timing of gear changes, so that gears can be smoothly changed in a short time.

In JP-A-11-82734 and JP-A-2001-208196, however, a connection mechanism for connecting a motor and a transmission is provided inside a power unit. The motor is directly mounted on a lower part of the power unit and projects outside from a casing of the power unit, which makes the lower part of the power unit large for the motor.

SUMMARY OF THE INVENTION

In view of the above, the present invention downsizes the power unit of a straddle-type vehicle in which clutch connecting/disconnecting and gear-change operations are performed by means of a common actuator.

A straddle-type vehicle in accordance with the invention includes a power unit with a crank shaft extending in a vehicle width direction. A rotating body is provided on one end of the crank shaft. A transmission has plural gears and a clutch is connected and disconnected in changing gears of the transmission. A shift shaft connects and disconnects the clutch and changes gears of the transmission by rotation. A casing covers the crank shaft, the rotating body, the transmission, the clutch and the shift shaft such that a part of the shift shaft is a projection part projecting outside. An actuator including an output shaft is provided over the shift shaft. A connection body connects the projection part of the shift shaft and the output shaft outside the casing. At least a part of the connection body extends behind the rotating body in a front and back direction of the vehicle in a side view.

In accordance with the invention, the output shaft of the actuator is provided over the shift shaft, so that the lower part of the power unit is prevented from being made large. Further, projection of the actuator outside the power unit in a direction of the width of the vehicle is minimized. Moreover, the output shaft of the actuator and the shift shaft are connected by the connection body, which is provided outside the casing of the power unit. This simplifies the inner structure of the power unit and allows the power unit to be downsized.

As described above, in accordance with the invention, a power unit can be made compact or downsized in a straddle-type vehicle in which a connecting and disconnecting operation of a clutch and a gear-change operation of a transmission are performed by means of a common actuator.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle in accordance with an embodiment of the invention.

FIG. 2 is a partially cut-off sectional view of a power unit according to the invention.

FIG. 3 is a sectional view of a power unit according to the invention.

FIG. 4 is an exploded perspective view of a part of a transmission according to the invention.

FIG. 5 is a left side view of a part of a motorcycle according to the invention.

FIG. 6 is a structural view of the inside of an actuator according to the invention.

FIG. 7(a) is a side view of a turning lever according to the invention. FIG. 7(b) is a view in the direction of arrow VIIb in FIG. 7(a).

FIG. 8(a) is a side view of a turning arm according to the invention. FIG. 8(b) is a view in the direction of arrow VIIIb in FIG. 8(a).

FIG. 9 is a side view of a rod according to the invention.

FIG. 10 is a plan view of a part of a motorcycle according to the invention.

FIG. 11 is a perspective view of a switch box according to the invention.

FIG. 12 is a left side view of a part of a motorcycle in accordance with a second embodiment of the invention.

FIG. 13 is a front view of a rod in accordance with the second embodiment.

FIG. 14(a) is a front view of a rod member according to the invention. FIG. 14(b) is a side view of the rod member.

DETAILED DESCRIPTION OF THE INVENTION

Embodiments of the invention are now described in detail with reference to the drawings.

Embodiment 1

As shown in FIG. 1, a straddle-type vehicle in accordance with a first embodiment of the invention is a motorcycle 10. The motorcycle 10 comprises a body frame 11 and a seat 16 on which a driver sits. The motorcycle 10 is a moped type motorcycle. "Moped type" as used herein refers only to a particular vehicle shape, and does not limit the maximum speed, quantity of exhaust gas, size of the vehicle, etc. Moreover, the present invention is not limited to a moped type motorcycle. It may be another type of motorcycle such as one in which a fuel tank is provided in front of the seat, an automatic tricycle, an ATV, or any other type.

In the following description, the front, back, left and right directions are directions from the perspective of a driver sitting on the seat 16. The body frame 11 comprises a steering head pipe 12, a main frame 13 extending obliquely downward and rearward from the steering head pipe 12, a pair of left and right seat rails 14 extending obliquely upward and rearward from the middle part of the main frame 13 and a pair of left and right backstays 15 extending obliquely upward from the main frame 13 behind the seat rail 14. The backstays 15 are connected to a rear end of the main frame 13 and a middle part of the seat rail 14. The steering head pipe 12 holds a front wheel 19 through a front fork 18.

Upper, left and right sides of the body frame 11 are mainly covered with a main cover 21a and a side cover 21b. The main cover 21a and the side cover 21b are collectively called a body cover 21 hereinafter.

On the middle part of the main frame 13, a pair of left and right first engine brackets 22 project downward. Left and right second engine brackets and left and right rear arm brackets (not shown) are provided at the rear end of the main frame 13. In the following description, a bracket provided on the main frame 13 or the like forms a part of the body frame 11.

The rear arm bracket projects downward from the rear end of the main frame 13 and is provided with a pivot shaft 86, which holds a front end of a rear arm 25 so that the rear arm can swing freely. The rear end of the rear arm 25 holds a rear wheel 26. A rear half of the rear arm 25 is suspended from the body frame 11 through a cushion unit 27.

A front fender 31 covers an upper part and a rear part of the front wheel 19 and a rear fender 32 covers an obliquely upper-rear part of a rear wheel 26. Front cowl 33 and left and right leg shields 34 are provided in addition to body cover 21.

The body frame 11 holds a power unit 28 for driving the rear wheel 26. The power unit 28 comprises a crank case 35 and a cylinder 43 extending forward or obliquely upward.

Footrests 85 are provided on the left and right sides of the power unit 28. The crank case 35 holds the footrests 85 through a connection rod 87 and a fitting plate 88 fixed to the connection rod 87.

The structure of the power unit 28 is described with reference to FIGS. 2 and 3. The power unit 28 comprises an engine 29 including a crank shaft 30, a centrifugal clutch 36, a change gear clutch 37 connected and disconnected in a gear-change operation and a transmission 38. While engine 29 is not limited in form at all, the engine 29 of the illustrated embodiment is a 4 cycle single cylinder engine.

As shown in FIG. 3, the centrifugal clutch 36 is mounted to a right end of the crank shaft 30. The centrifugal clutch 36 comprises a clutch boss fixed to the clank shaft 30 and a clutch housing (not shown). The centrifugal clutch 36 is disconnected in idling and connected in running. That is, centrifugal clutch 36 is disconnected when the number of rotations of the crank shaft 30 (the engine rotation number) is smaller than a predetermined number of rotations, and is connected when the number of rotations reaches the predetermined number.

The change gear clutch 37 is a wet-type multi-plate clutch and comprises a clutch boss 37a and a clutch housing 37b. The change gear clutch 37, however, is not specifically limited in kind. The centrifugal clutch 36 is provided with a gear 41. The clutch housing 37b of the change gear clutch 37 is provided with a gear 42. The gear 41 and the gear 42 are engaged with each other. Accordingly, the clutch housing 37b of the change gear clutch 37 rotates together with the centrifugal clutch 36 (specifically, a clutch housing of the centrifugal clutch 36).

The clutch boss 37a is mounted to and rotates together with a main shaft 44. The clutch housing 37b is mounted to the main shaft 44 and rotates freely. The clutch boss 37a is provided with plural friction plates 39a. The clutch housing 37b is provided with plural clutch plates 39b. The respective friction plates 39a are provided between adjacent clutch plates 39b.

A pressure plate 37c is provided on the right side of the clutch boss 37a. The pressure plate 37c is freely slidable in the axial direction and urged to the left side by means of a compression spring 60. That is, the pressure plate 37c is urged in a direction such that the friction plate 39a and the clutch plate 39b are made to contact each other by pressure. The friction plate 39a is separated from the clutch plate 39b when the pressure plate 37c moves rightward against urging force of the compression spring 60, so that the change gear clutch 37 is disconnected.

As shown in FIG. 2, plural transmission gears 46 are provided on an outer circumference side of the main shaft 44. Plural transmission gears 47 are mounted to a drive shaft 45 arranged parallel to the main shaft 44. The transmission gears 46 on the main shaft 44 side are properly engaged with the transmission gears 47 on the drive shaft 45 side.

One or both of the transmission gears 46 and the transmission gears 47 other than selected gears is or are mounted to the main shaft 44 or the drive shaft 45 with an idling state. Accordingly, driving force from the main shaft 44 to the drive shaft 45 is transmitted through any one of the selected pairs of the transmission gears.

Selection of the transmission gears is carried out via a shift cam 113 (refer to FIG. 4). The transmission 38 comprises a shift fork 111a for sliding the transmission gear 46 in the axial direction of the main shaft 44 and a slide rod 112a along which shift fork 111a can slide freely. The transmission 38 further comprises a shift fork 111b for sliding the transmission gear 47 in the axial direction of the drive shaft 45 and a slide rod 112b along which shift fork 111b can slide freely. A cam groove 113a is formed around the shift cam 113. The shift forks 111a and 111b slide along the cam groove 113a.

The shift cam 113 rotates via a ratchet mechanism 115 in accordance with rotation of the shift shaft 70. The ratchet mechanism 115 rotates the shift cam 113 at every specified interval (angle) to move the shift forks 111a and 111b regularly. The ratchet mechanism 115 has a ratchet function in both the normal and reverse directions for changing gears by every stage. A shift arm 116 of the ratchet mechanism 115 transmits rotation of the shift shaft 70 and simultaneously controls a stroke of the shift shaft 70 to prevent an overrun of the shift cam 113. A stopper plate 117 of ratchet mechanism 115 fixes shift cam 113 at a determined position.

As shown in FIG. 3, the hollow main shaft 44 is held by a bearing 540 to be freely rotatable. A first push rod 527, a ball 528 and a second push rod 529 are inserted into main shaft 44 to be freely movable in the axial direction. Movement of these components causes left and right movement of pressure plate 37c.

The second push rod 529 is formed with a brim 529b. A bearing 533 is provided between the brim 529b and the pressure plate 37c. This allows pressure plate 37c to be rotatable, in contrast to second push rod 529, which cannot rotate.

A male screw 535a of the shift shaft 70 is screwed into a nut 536a on one end of a lever member 536. The other end 536b of the lever member 536 is in contact with a small-diameter part 527b of the first push rod 527. A fulcrum part 536c at the center of lever member 536 is connected to a support shaft 537 so that the lever member 536 can swing on the fulcrum part 536c.

The nut part 536a of the lever member 536, into which the male screw 535a of the shift shaft 70 is screwed, moves to the left side when the shift shaft 70 rotates. The movement of the nut 536a causes the lever member 536 to swing, and thereby, the other end 536b of the lever member 536 pushes the first push rod 527 rightward, so that the first push rod 527 slides rightward. The second push rod 529 is pushed rightward through the ball 528 by first push rod 527 to slide rightward.

The slide of the second push rod 529 causes the pressure plate 37*c* to move rightward against the urging force of the compression spring 60. As a result, contact by pressure between the friction plate 39*a* and the clutch plate 39*b* is released and the transmission clutch 37 is disconnected.

As described above, the shift shaft 70 and the pressure plate 37*c* are connected through the lever member 536, the first push rod 527, the ball 528 and the second push rod 529, and the pressure plate 37*c* moves in accordance with rotation of the shift shaft 70. That is, when the shift shaft 70 starts rotation and a rotation angle of the shift shaft 70 reaches a predetermined angle (a clutch disconnection starting angle), the pressure plate 37*c* moves rightward and the transmission clutch 37 is disconnected. After the shift shaft 70 further rotates to reach a predetermined angle (a change gear starting angle), the shift cam 113 rotates to perform a change gear operation.

A fly wheel magnet 50 is fitted to a left end of the crank shaft 30 and rotates together as a rotating body with the crank shaft 30. The fly wheel magnet 50 forms a rotor of a generator 51. The rotating body is not limited to the fly wheel magnet 50, but may be another rotating body such as a fly wheel and the like.

As shown in FIG. 2, the crank case 35 comprises a first casing 52 and a second casing 53. The first casing 52 is formed from plural casing members and mainly covers a part of the crank shaft 30, the centrifugal clutch 36, the transmission clutch 37, the main shaft 44, a part of the drive shaft 45, the shift cam 113 and such. The second casing 53 is located at a front side of first casing 52 and covers the fly wheel magnet 50. The second casing 53 projects to the outer side of the first casing 52 in the width direction of the vehicle (to the left side in FIG. 2). The first casing 52 and the second casing 53 are separately formed, but may alternatively be formed as one body.

As shown in FIG. 3, a part of the shift shaft 70 projects outside the crank case 53 to form a projection part 70*a*. A part of the drive shaft 45 also projects from the crank case 35 as shown in FIG. 2. A sprocket 54 is fixed at a projection part 45*a* of the drive shaft 454. A chain 55, which is used as a power transmitting member, is wound around the sprocket 54 and a sprocket (not shown) of the rear wheel 26. The power transmitting member for transmitting driving force of the drive shaft 45 to the rear wheel 26 is not limited to the chain 55 and could be, for example, a transmission belt and a drive shaft.

As shown in FIG. 5, a chain cover 56 is provided over a side surface of the chain 55 (on a front surface side of the sheet showing FIG. 5). The chain cover 56 covers the upper and lower parts of the chain 55 and the outer side in the vehicle width direction. The cylinder 43 (refer to FIG. 1) of the power unit 28 is omitted from illustration in FIG. 5.

As shown in FIG. 5, an actuator 75 for rotating the shift shaft 70 is connected to the shift shaft 70 through a connection body 61. The structure of the actuator 75 is now described.

As shown in FIG. 6, the actuator 75 comprises a motor 77 formed from a motor main body 77*a* and a motor shaft 77*b*, a worm 79 fixed to the motor shaft 77*b*, a worm wheel 80 engaged with the worm 79 and an output shaft 81 used as a rotation shaft of the worm wheel 80. The actuator 75 also comprises a case 76 housing the motor 77, the worm 79 and the worm wheel 80. The case 76 has a thin width in the axial direction of the output shaft 81 (refer to FIG. 10) and is formed from freely separable first and second case members 76*a* and 76*b*. The second case member 76*b* located outside in the vehicle width direction has a hole into which an output shaft 81 is inserted. The output shaft 81 projects outside the case 76 through the hole.

As shown in FIG. 6, plural bolt holes 73 and 74 are formed in a circumferential part of case members 76*a* and 76*b*. Case members 76*a* and 76*b* are fastened by means of a bolt (not shown) inserted into the bolt holes 73 and 74. The main frame 13 and the seat rail 14 are provided with brackets 24 as shown in FIG. 5. Case members 76*a* and 76*b* are mounted to the brackets 24 by means of a bolt (not shown) inserted into the bolt hole 74. Actuator 75 is provided in an area A1 defined by the main frame 13, the seat rail 14 and the backstay 15 in a side view.

The motor 77 extends in a direction crossing at right or substantially right angles with the vehicle width direction, as shown in FIGS. 5 and 6. That is, an axial line 77*c* of the motor 77 crosses at almost right angles with the vehicle width direction in Embodiment 1. The axial line 77*c* is also an axial line of the worm 79. Output shaft 81 extends in a direction crossing at right angles with axis line 77*c*. Accordingly, output shaft 81 extends substantially in the vehicle width direction.

A worm gear formed from the worm 79 and the worm wheel 80 has a large reduction ratio set at 100 or more in the first embodiment.

Connection body 61 connecting the actuator 75 and the shift shaft 70 is now described.

As shown in FIG. 5, the connection body 61 connects the output shaft 81 of the actuator 75 and the projection part 70*a* of the shift shaft 70 outside the crank case 35 of the power unit 28. The projection part 70*a* of the shift shaft 70 is located on the obliquely lower and rear side of the fly wheel magnet 50 in a side view. The connection body 61 comprises a turning lever 71 connected to the output shaft 81, a turning arm 72 connected to the projection part 70*a* of the shift shaft 70 and a rod 63 connecting the turning lever 71 and the turning arm 72. The rod 63 is connected to the turning lever 71 and the turning arm 72 so as to be freely inclinable in the vehicle width direction.

Rod 63 and the turning lever 71 and rod 63 and the turning arm 72 are connected to each other by means of a connection fitting that allows rod 63 to freely incline in the vehicle width direction, such as a ball joint 64 as shown in FIGS. 7 and 8. That is, one end of the rod 63 is connected to the turning lever 71 through the ball joint 64 while the other end of the rod 63 is connected to the turning arm 72 through the ball joint 64.

The ball joint 64 comprises a cylinder part 64*a* into which a top end of the rod 63 is inserted and a ball part 64*b* supporting the cylinder part 64*a* so that the cylinder part 64*a* can freely rotate through 360°. A nut 69 for fastening the inserted rod 63 is fitted on a top end side of the cylinder part 64*a*. The rod 63 is connected to the ball joint 64 so as to be freely detachable.

A first connection part 71*b* is formed on a base side of the turning lever 71 (on the right side in FIG. 7(*a*)) substantially in the shape of C in a side view. A fixed hole 71*a* into which the output shaft 81 of the actuator 75 is fitted is formed at the center of the first connection part 71*b*. A bolt hole 71*c* into which a bolt 66 is inserted is formed on the right side of the fixed hole 71*a*. The bolt 66 fixes the first connection part 71*b* and the output shaft 81. That is, turning lever 71 and output shaft 81 are connected through the bolt 66 so as to be freely detachable.

A second connection part 72*b* is formed on a base side of the turning arm 72 (on the left side in FIG. 8(*a*)) substantially in the shape of C in a side view, as shown in FIG. 8. A fixed hole 72*a* into which the projection part 70*a* of the shift shaft 70 is fitted is formed at the center of the second connection part 72b. A bolt hole 72c into which a bolt 66 is inserted is formed on the lower side of the fixed hole 72a. The bolt 66 fixes the second connection part 72b and the projection part 70a of the shift shaft 70. The turning arm 72 and the projection part 70a of the shift shaft 70 are connected through the bolt 66 so as to be freely detachable.

The turning lever 71 is formed into the shape of a flat plate extending almost in the front and back direction, as shown in FIG. 7. The turning arm 72 is also formed into the shape of a flat plate extending almost in the front and back direction, as shown in FIG. 8. The turning arm 72, however, does not extend straightly in one direction, but bends toward the inside in the vehicle width direction as it approaches the top end from the base. However, the structures of the turning lever 71 and the turning arm 72 are not so limited.

As shown in FIG. 9, the rod 63 is formed as an integrated body. The rod 63 is provided in a vertical or substantially vertical direction in a side view, as shown in FIG. 5. The rod 63 extends vertically behind the fly wheel magnet 50 in a side view. That is, the rod 63 extends by the side of the first casing 52 and behind the second casing 53. The rod 63 also overlaps the sprocket 54 connected to the drive shaft 45 in a side view. Moreover, the rod 63 overlaps the chain 55 in a side view.

As shown in FIG. 10, the rod 63 slants in the vehicle width direction. Turning lever 71 is provided inward in the vehicle width direction of the turning arm 72. The rod 63 slants so that its upper end is located inward in the vehicle width direction relative to its lower end. The rod 63 is inward in the vehicle width direction of the outer end of the second casing 53.

An inner cover 82 is provided between the rod 63 and the chain 55 as shown in FIG. 5. The inner cover 82 is formed from a bending plate that is long and narrow in the vertical direction and makes a partition between the rod 63 and the chain 55. The inner side surface of the inner cover 82 is close to the chain 55. The position and fixing method of the inner cover 82 are not limited at all. For example, the inner cover 82 may be fixed on the crankcase 35, a bracket not shown or the like by means of a bolt not shown.

As shown in FIGS. 1 and 10, an outer cover 83 covers most of rod 63 and turning arm 72. The outer cover 83 also covers the side part of the chain 55 together with the chain cover 56. A concave 83a through which rod 63 passes vertically is formed in an upper surface of outer cover 83, as shown in FIG. 10.

The position and fixing method of the outer cover 83 are not limited. The outer cover 83 may be fixed on the crank case 35, a bracket not shown, the chain cover 56 or the like by means of a bolt 84 (refer to FIG. 1), for example. The outer cover 83 is detachable with the side cover 21b and the actuator 75 being fixed. That is, only the outer cover 83 can be detached without taking the side cover 21b or the actuator 75 off. The outer cover 83 may be an integrated body or a combination of plural cover members.

The actuator 75 and the turning lever 71 are covered by side cover 21b and therefore not visible in FIG. 1. The outer cover 83 and the side cover 21b cover almost all of the connection body 61.

As shown in FIG. 11, a switch box 94 including a shift switch 95 is provided on a left grip side of the steering handle. The shift switch 95 includes a shift-up switch 95a and a shift-down switch 95b and is for increasing or decreasing a shift position of the transmission 38 between the first gear and the maximum gear (the sixth gear, for example) in accordance with a manual operation by a driver. When the shift-up switch 95a or the shift-down switch 95b is pressed, the actuator 75 operates and the shift shaft 70 is driven to rotate through the connection body 61. The transmission clutch 37 is then disconnected in accordance with the rotation of the shift shaft 70 to change a combination of the gears 46 and 47 of the transmission 38 (a combination of gears engaged with each other), so that a change gear operation is carried out.

As described above, in accordance with the invention, the power unit 28, the actuator 75 including the output shaft 81 provided over the shift shaft 70 and the connection body 61 connecting the projection part 70a of the shift shaft 70 and the output shaft 81 outside the casing (the crank case 35) of the power unit 28 are provided. Rod 63 of connection body 61 extends behind the fly wheel magnet 50 in a side view (refer to FIG. 5).

This keeps the lower part of the power unit 28 from being too large. Further, the degree of projection of actuator 75 to the outside of the power unit 28 in the vehicle width direction is kept small. Moreover, the inner structure of the power unit 28 is simplified since the connection body 61 is provided outside the power unit 28. In addition, the power unit 28 can be made more compact since the connection body 61 is not provided inside the power unit 28.

Furthermore, in accordance with the invention, the rod 63 extends by the side of the first casing 52 and behind the second casing 53. This allows spaces on a side of the first casing 52 and a rear side of the second casing 53 to be effectively used to accommodate rod 63, so that rod 63 does not project in the vehicle width direction, and permits further downsizing of motorcycle 10.

In accordance with the invention, rod 63 overlaps chain 55 in a side view. Accordingly, the rod 63 can be provided with a high density, in contrast to a case where rod 63 does not overlap chain 55. Further, the interval between the second casing 53 and the drive shaft 45 in a side view does not need to be large in order to prevent the rod 63 and the chain 55 from overlapping. Accordingly, the length of the power unit 28 in the front and back direction is not longer than the conventional case, and motorcycle 10 can be further downsized.

Rod 63 extends in the vertical direction in accordance with the invention and is accordingly short in length in the front and back direction. Moreover, the necessary length of the rod 63 can be shortened.

The actuator 75 may be separated from or provided in the power unit 28. Thus, there is a high degree of freedom in providing actuator 75. Further, actuator 75 has improved reliability and prolonged life since there is no direct influence of heat or vibration from the power unit 28.

In accordance with the invention, area A1 defined by the main frame 13, the seat rail 14 and the backstay 15 in a side view is effectively used as a space for accommodating the actuator 75.

In accordance with the invention, the outside in the vehicle width direction of the rod 63 is covered with the outer cover 83. This allows the rod 63 to be protected. The outer cover 83 also covers a part of the turning lever 71 and the turning arm 72, so that the turning lever 71 and the turning arm 72 are also protected. Further, the turning lever 71 and the actuator 75 are covered and protected by the side frame 21b.

According to the invention, the inner cover 82 makes a partition between the rod 63 and the chain 55. This can keeps dirt off the rod 63 due to the chain 55. Further, there is no concern of interference of the rod 63 and the chain 55, so that the rod 63 can be located closely to the chain 55. Accordingly, the rod 63 can be provided inside more, and further downsizing is achieved.

The actuator 75 includes the worm gear formed from the worm 79a and the worm wheel 80. A large reduction ratio of the worm gear allows the space necessary for achieving a predetermined reduction ratio to be kept down in size.

Accordingly, the actuator 75 can be smaller. Moreover, the worm gear is difficult to be rotated reversely, so that reverse rotation of the motor 77 of the actuator 75 is minimized or prevented.

Furthermore, according to the invention, the axis line 77c of the motor 77 of the actuator 75 extends in a direction crossing at right or substantially right angles with the vehicle width direction, so that the output shaft 81 extends in a direction along the vehicle width direction. This causes the connection body 61 to move in a plane crossing at right angle with the vehicle width direction (in a plane in the front and back direction of the vehicle, for example). Accordingly, the connection body 61 does not project in the vehicle width direction in moving, thereby facilitating further downsizing of the motorcycle 10.

The connection body 61 comprises the first connection part 71b (refer to FIG. 7(a)) connected to the output shaft 81 of the actuator 75 and a second connection part 72b (refer to FIG. 8(a)) connected to the projection part 70a of the shift shaft 70. The first connection body 71b is located more inside in the vehicle direction than the second connection part 72b. This allows the actuator 75 to be located inside more, facilitating downsizing of the motorcycle 10.

Moreover, in accordance with the invention, the rod 63 is connected to the turning lever 71 and the turning arm 72, respectively, so as to freely lean or slant in the vehicle width direction. This allows the actuator 75 to be located inside, using the rod 63 extending straightly. In other words, the actuator 75 is provided inside on the basis of a simple structure.

Embodiment 2

Rod 63 of the connection body 61 is modified in a second embodiment, as shown in FIGS. 12 and 13.

In the second embodiment, the rod 63 is formed from plural rod members connected so as to be freely detachable from each other, such as first and second rod members 91 and 92.

As shown in FIGS. 14(a) and 14(b), a substantially U-shaped grip part 92a opening upward is formed on an upper side of the second rod member 92. The grip part 92a is provided with two circle holes 92b aligned side by side in the vertical direction and two nut parts 92c aligned side by side in the vertical direction to correspond to the circle holes 92b. An inserting part 91a is formed on a lower side of the first rod member 9 to be inserted into the grip part 92a. Two holes 91b that are vertically long and narrow are formed in the inserting part 91a.

As shown in FIG. 13, the first rod member 91 and the second rod member 92 are fastened by bolts 93 inserted into the circle holes 92c, the long holes 91b and the nut parts 92c. Bolts 93 are freely slidable in the vertical direction in the long holes 91b since the inserting part 91a is provided with the long holes 91b. Accordingly, the first rod member 91 and the second rod member 92 can be relatively moved in the axial direction, which allows the rod 63 to be adjusted in length.

The first rod member 91 and the second rod member 92 are connected as follows. The inserting part 91a of the first rod member 91 is first inserted into the grip part 92a of the second rod member 92. The bolt 93 is then inserted into the circle hole 92b of the grip part 92a, the long hole 91b of the inserting part 91a and the nut part 92c of the grip part 92a to be fixed temporarily. Next, the first and second rod members 91 and 92 are relatively moved in the axial direction so that the whole length of the rod 63 is a desired length. In other words, the rod 63 is adjusted in length. The bolt 93 is screwed into the nut part 92c to be tightly fixed after the length of the rod 63 is adjusted to be the desired length.

Description of the remaining structures is omitted since they are the same as in the first embodiment.

The second embodiment achieves effects similar to those of the first embodiment.

Other Embodiments

The invention is not limited to the described embodiments and can be carried out in various other modes.

Shift shaft 70, while depicted as a single shaft, could instead be formed from two or more shafts as long as it can connect and disconnect the clutch and change gears of the transmission by rotation. For example, the shift shaft 70 may be divided into two shafts through gear wheels or the like inside the crank case 35 to connect and disconnect the clutch by means of one shaft and to change gears of the transmission by means of the other shaft so as to synchronize.

As described above, the invention is useful for a straddle-type vehicle.

The particular embodiments of the invention described in this document should be considered illustrative, rather than restrictive. Modification to the described embodiments may be made without departing from the spirit of the invention as defined by the following claims.

The invention claimed is:

1. A straddle-type vehicle comprising:
   a power unit including a crank shaft extending in a vehicle width direction;
   a rotating body provided on one end of the crank shaft;
   a transmission having plural gears;
   a clutch connected and disconnected in changing gears of the transmission;
   a shift shaft for connecting and disconnecting the clutch and changing gears of the transmission by rotation;
   a casing covering the crank shaft, the rotating body, the transmission, the clutch and the shift shaft such that a part of the shift shaft is a projection part projecting outside;
   an actuator including an output shaft provided over the shift shaft; and
   a connection body for connecting the projection part of the shift shaft and the output shaft outside the casing,
   wherein at least a part of the connection body extends behind the rotating body in a front and back direction of the vehicle in a side view.

2. The straddle-type vehicle according to claim 1, wherein the casing comprises:
   a first casing part; and
   a second casing part covering at least a part of the rotating body, located in front of the first casing part in the front and back direction of the vehicle and projecting to an outer side of the first casing part in the vehicle width direction, and
   wherein at least a part of the connection body extends by a side of the first casing part and behind the second casing part.

3. The straddle-type vehicle according to claim 1, wherein the power unit includes a drive shaft, and further comprising:
   a rear wheel; and
   a power transmitting member for connecting the drive shaft and the rear wheel,
   wherein at least a part of the connection body overlaps the power transmitting member in a side view.

4. The straddle-type vehicle according to claim 1, wherein the connection body comprises:

a turning lever connected to the output shaft;

a turning arm connected to the projection part of the shift shaft; and a rod connected to the turning lever and the turning arm and extending in a vertical direction in a side view.

5. The straddle-type vehicle according to claim 1, wherein the actuator is separated from the power unit.

6. The straddle-type vehicle according to claim 5, comprising:

a main frame extending obliquely downward and rearward;

a seat rail extending obliquely upward and rearward from the main frame; and a backstay extending obliquely upward and rearward from the main frame behind the seat rail, wherein at least a part of the actuator is provided in an area defined by the main frame, the seat rail and the backstay in a side view.

7. The straddle-type vehicle according to claim 1, comprising a cover for covering an outside of at least a part of the connection body in the vehicle width direction.

8. The straddle-type vehicle according to claim 3, comprising a cover for making a partition between the connection body and the power transmitting member.

9. The straddle-type vehicle according to claim 1, wherein the actuator comprises:

a motor;

a worm driven by the motor; and a worm wheel engaged with the worm for rotating the output shaft.

10. The straddle-type vehicle according to claim 9, wherein the motor extends in a direction crossing at right angles with the vehicle width direction.

11. The straddle-type vehicle according to claim 1, wherein the connection body comprises:

a first connection part connected to the output shaft of the actuator; and a second connection part connected to the projection part of the shift shaft, wherein the first connection part is located on an inner side of the second connection part in the vehicle width direction.

12. The straddle-type vehicle according to claim 1, wherein the connection body comprises:

a turning lever connected to the output shaft;

a turning arm located on an outer side of the turning lever in the vehicle width direction and connected to the projection part of the shift shaft; and a rod connected to the turning lever and the turning arm to freely lean in the vehicle width direction.

* * * * *